(12) United States Patent
Huang et al.

(10) Patent No.: US 12,287,046 B2
(45) Date of Patent: Apr. 29, 2025

(54) VALVE SEAT, PLUG VALVE, AND FRACTURING MANIFOLD

(71) Applicant: Yantai Jereh Petroleum Equipment & Technologies Co., Ltd., Yantai (CN)

(72) Inventors: Jinling Huang, Yantai (CN); Changxiao Zuo, Yantai (CN); Shulin Zhang, Yantai (CN); Jixin Wang, Yantai (CN); Anpeng Ge, Yantai (CN); Yilong Zhu, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 0 days.

(21) Appl. No.: 17/794,993

(22) PCT Filed: Feb. 9, 2022

(86) PCT No.: PCT/CN2022/075701
§ 371 (c)(1),
(2) Date: Jul. 25, 2022

(87) PCT Pub. No.: WO2023/005185
PCT Pub. Date: Feb. 2, 2023

(65) Prior Publication Data
US 2024/0209949 A1    Jun. 27, 2024

(30) Foreign Application Priority Data

Jul. 29, 2021  (CN) .......................... 202121747545.0

(51) Int. Cl.
*F16K 5/04* (2006.01)
*F16K 5/20* (2006.01)

(52) U.S. Cl.
CPC ............ *F16K 5/0471* (2013.01); *F16K 5/201* (2013.01)

(58) Field of Classification Search
CPC ...... F16K 5/0471; F16K 5/0689; F16K 5/181; F16K 5/201; F16K 5/0678; F16K 3/20
See application file for complete search history.

(56) References Cited

U.S. PATENT DOCUMENTS 4,137,936 A * 2/1979 Sekimoto .............. F16K 5/0673
251/315.08
4,513,947 A * 4/1985 Amend ..................... F16K 3/20
251/328

(Continued)

FOREIGN PATENT DOCUMENTS

CN       110686092 A  *  1/2020

OTHER PUBLICATIONS

Machine English translation of CN110686092A (Year: 2024).*

Primary Examiner — Hailey K. Do
(74) Attorney, Agent, or Firm — XSENSUS LLP (57) ABSTRACT

A valve seat, a plug valve, and a fracturing manifold are provided. The valve seat includes a sealing valve seat in an annular shape and a mounting valve seat in an annular shape. The sealing valve seat includes a sealing valve seat inner hole, and the mounting valve seat includes a mounting valve seat inner hole. The sealing valve seat is nested inside the mounting valve seat, and the sealing valve seat inner hole communicates with the mounting valve seat inner hole. In axial and radial directions of the sealing valve seat inner hole, or axial and radial directions of the mounting valve seat inner hole, an outer surface of the sealing valve seat abuts against an inner surface of the mounting valve seat.

17 Claims, 8 Drawing Sheets

(56) References Cited

U.S. PATENT DOCUMENTS

| | | | | |
|---|---|---|---|---|
| 4,601,308 A * | 7/1986 | Stone | .................... | F16K 5/0631 |
| | | | | 251/363 |
| 6,217,002 B1 * | 4/2001 | Shafer | ................... | F16K 5/0673 |
| | | | | 251/192 |
| 6,345,805 B1 * | 2/2002 | Chatufale | ............. | F16K 5/0471 |
| | | | | 251/309 |
| 6,664,572 B2 * | 12/2003 | Chatufale | ............... | F16K 3/207 |
| | | | | 251/329 |
| 7,562,859 B2 * | 7/2009 | Lam | ..................... | F16K 3/0227 |
| | | | | 251/327 |
| 8,672,295 B2 * | 3/2014 | Dhawan | .................... | F16K 3/20 |
| | | | | 251/328 |
| 9,453,578 B2 * | 9/2016 | Sundararajan | ........ | F16K 3/0236 |
| 11,181,201 B2 * | 11/2021 | Ray | ......................... | F16K 5/205 |

\* cited by examiner

VALVE SEAT, PLUG VALVE, AND FRACTURING MANIFOLD

CROSS-REFERENCE TO RELATED APPLICATIONS

This application is based on PCT filing PCT/CN2022/075701, filed Feb. 9, 2022, which claims priority to Chinese Patent Application No. 202121747545.0, filed on Jul. 29, 2021, each of which is incorporated herein by reference in its entirety.

TECHNICAL FIELD

The present disclosure relates to the field of valve technology, and in particular, to a valve seat, a plug valve, and a fracturing manifold.

BACKGROUND

In the oil field, fracturing refers to a method of using high-pressure gas (e.g., high energy gas fracturing) or liquid (e.g., hydraulic fracturing) to create cracks in oil and gas formations during oil or gas production. In actual operation, a fracturing truck is used to inject a high-pressure fluid into oil and gas wells at a high speed, so that the high-pressure fluid breaks the rocks and creates cracks in the oil and gas formations.

In order to prevent the cracks from closing as the pressure drops after the fracturing truck stops working, in addition to the high-pressure fluid, sand particles and other substances also need to be injected into the cracks together with the fluids and be trapped in the cracks permanently, so as to keep the cracks open and improve the oil flow in the long term.

A plug valve is a valve in which the valve core inside can be rotated to allow or stop the flow of the fluid. A fracturing manifold is required to introduce the high-pressure fluid from the fracturing truck into the oil and gas wells, and the plug valve is an indispensable part of the fracturing manifold.

SUMMARY

In one aspect, a valve seat is provided. The valve seat includes a sealing valve seat in an annular shape and a mounting valve seat in an annular shape. The sealing valve seat includes a sealing valve seat inner hole, and the mounting valve seat includes a mounting valve seat inner hole. The sealing valve seat is nested inside the mounting valve seat, and the sealing valve seat inner hole communicates with the mounting valve seat inner hole. In axial and radial directions of the sealing valve seat inner hole, or axial and radial directions of the mounting valve seat inner hole, an outer surface of the sealing valve seat abuts against an inner surface of the mounting valve seat.

In another aspect, a plug valve is provided. The plug valve includes a valve body, a valve core, and two valve seats as described above. The valve body includes a valve cavity and a flow path communicating with the valve cavity. The valve core is disposed in the valve cavity, and includes a valve core hole penetrating the valve core. The two valve seats are disposed on both sides of the valve core and opposite each other, and two sealing valve seat inner holes and two mounting valve seat inner holes communicate with the flow path. A surface of each sealing valve seat away from the mounting valve seat is fitted to a periphery of the valve core hole of the valve core, and a surface of each mounting valve seat away from the sealing valve seat abuts against an inner surface of the valve cavity.

In yet another aspect, a fracturing manifold is provided. The fracturing manifold includes at least two pipes and the plug valve as described above. The plug valve is disposed between two adjacent pipes, and the two adjacent pipes both communicate with a flow path of the plug valve.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and actual timings of a signal involved in the embodiments of the present disclosure.

REFERENCE SIGNS

100—Plug valve;
110—Valve body; 111—Valve cavity; 112—Mounting hole; 1121—First hole wall;
1122—Second hole wall; 113—Flow path; 114—Valve stem cavity; 115—First end; 116—Second end;
120—Valve core; 121—Valve core hole;
101—Valve seat;
130—Sealing valve seat; 131—First sealing surface; 1311—First sealing groove;
132—Second sealing surface; 1321—Second sealing groove; 133—Third sealing surface;
1331—First elastic groove; 134—Curved surface; 135—Sealing valve seat inner hole;
140—Mounting valve seat; 141—First mounting surface; 142—Second mounting surface; 143—Third mounting surface; 1431—Second elastic groove; 144—Fourth mounting surface; 1441—Third sealing groove; 1442—Fourth sealing groove; 145—Fifth mounting surface; 1451—Expansion groove; 146—Mounting valve seat inner hole;

150—Valve stem;

160—Elastic member; 161—Elastic sheet; 1611—Inner ring; 1612—Outer ring;

170—Expansion band;

181—First sealing ring; 182—Second sealing ring; 183—Third sealing ring; 184—Fourth sealing ring; 185—Fifth sealing ring;

190—Valve seat body; 191—First valve seat surface; 192—Second valve seat surface; 193—Inner hole;

200—Pipe.

DETAILED DESCRIPTION

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

In the description of the present disclosure, it will be understood that orientations or positional relationships indicated by terms "center", "upper", "lower", "top", "bottom", "inner", "outer", etc. are based on orientations or positional relationships shown in the drawings, which are merely to facilitate and simplify the description of the present disclosure, but not to indicate or imply that the devices or elements referred to must have a particular orientation, or must be constructed or operated in a particular orientation. Therefore, these terms should not be construed as limitations to the present disclosure.

Terms "first" and "second" are merely used for a purpose of description and are not to be construed as indicating or implying the relative importance or implicitly indicating the number of indicated technical features. Thus, features defined with "first" or "second" may explicitly or implicitly include one or more of the features. In the description of the present disclosure, the term "a/the plurality of" means two or more unless otherwise specified.

In the description of the embodiments of the present disclosure, it will be noted that term "mounted", "connected", or "connection" is to be understood broadly. For example, it may be a fixed connection, a detachable connection, or an integral connection; and it may be a direct connection, an indirect connection through an intermediate medium, or an internal communication between two elements. Specific meanings of the above terms in the present disclosure may be understood by a person of ordinary skill in the art according to specific situations.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where", depending on the context.

The phrase "applicable to" or "configured to" as used herein indicates an open and inclusive expression, which does not exclude devices that are applicable to or configured to perform additional tasks or steps.

In addition, the phrase "based on" as used herein is meant to be open and inclusive, since a process, step, calculation or other action that is "based on" one or more of the stated conditions or values may, in practice, be based on additional conditions or values beyond those stated.

As used herein, the terms "about", "substantially" or "approximately" includes a stated value and an average value within an acceptable range of deviation of a particular value. The acceptable range of deviation is determined by a person of ordinary skill in the art in view of the measurement in question and errors associated with measurement of a particular quantity (i.e., limitations of the measurement system).

Figure 1:
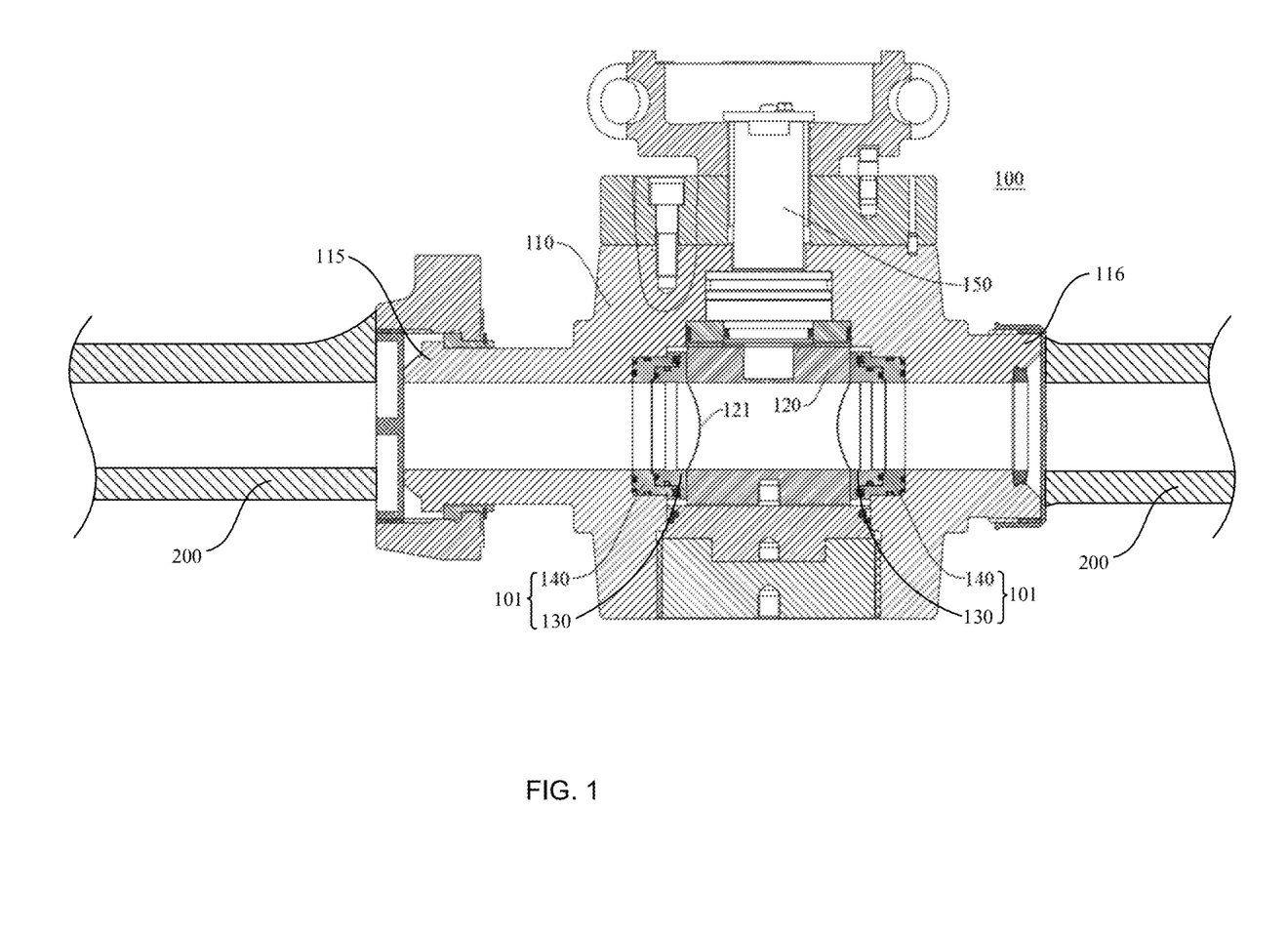
FIG. 1 is a structural diagram of a fracturing manifold, according to some embodiments.

Some embodiments of the present disclosure provide a fracturing manifold. As shown in FIG. 1, the fracturing manifold includes a plug valve 100 and two pipes 200. Both ends of the plug valve 100 are connected to the pipe 200 through a flange, a clamp, or other structures. The fracturing manifold is used to charge high-pressure gas or liquid (hereinafter referred to as fluid) into oil and gas wells to meet requirements of fracturing the oil and gas wells. The fracturing manifold is not limited to including two pipes 200, and may include more pipes 200 depending on the requirements of operation. For example, in a case where a distance between the fracturing truck and the oil and gas wells is long, more (more than two) pipes 200 are required to introduce the high-pressure fluid in the fracturing truck into the oil and gas wells. Two adjacent pipes 200 may be connected by a plug valve 100, so that the plug valve 100 may be used to allow or shut off the flow of the fluid. Moreover, in addition to the pipe 200, the plug valve 100 may also be connected to a fluid outlet of the fracturing truck, a tee joint, etc.

The fluid flowing into the plug valve 100 from the pipe 200 usually contains sand particles and other impurities. After the plug valve 100 has been used for a long time, the sand particles may be easily accumulated in the plug valve 100, causing the plug valve 100 to be stuck.

Therefore, some embodiments of the present disclosure further provide a plug valve 100.

Figure 2:
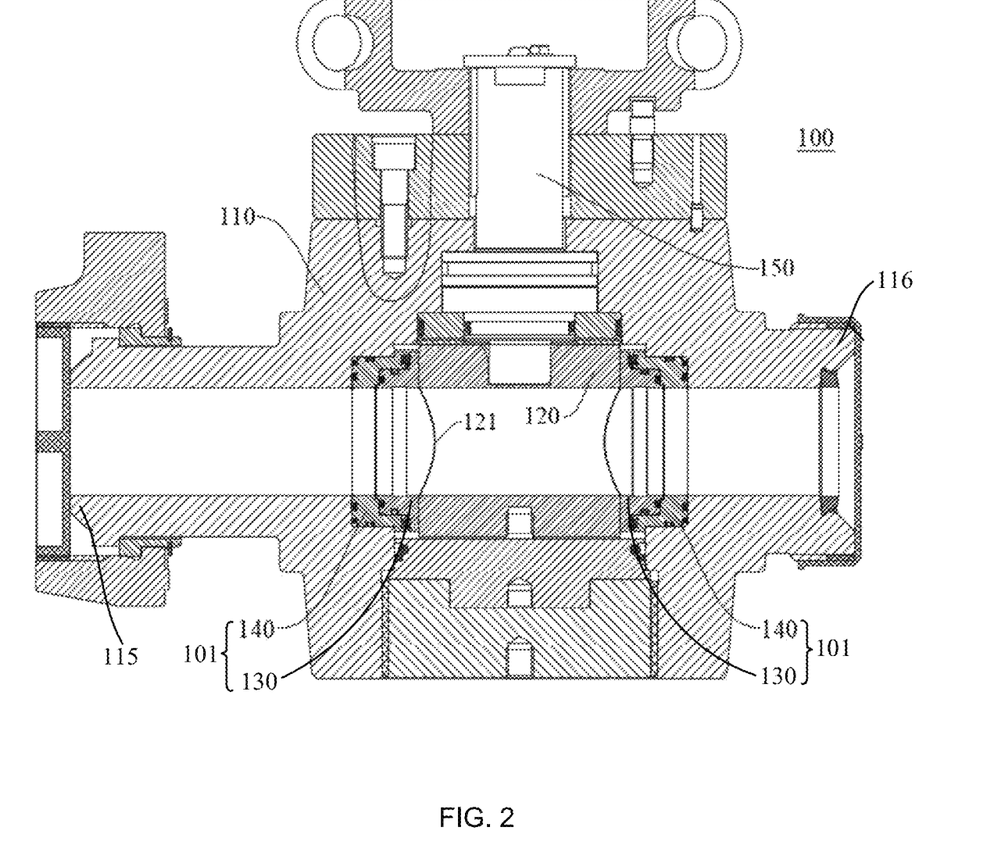
FIG. 2 is a structural sectional diagram of the plug valve in FIG. 1.
Figure 3:
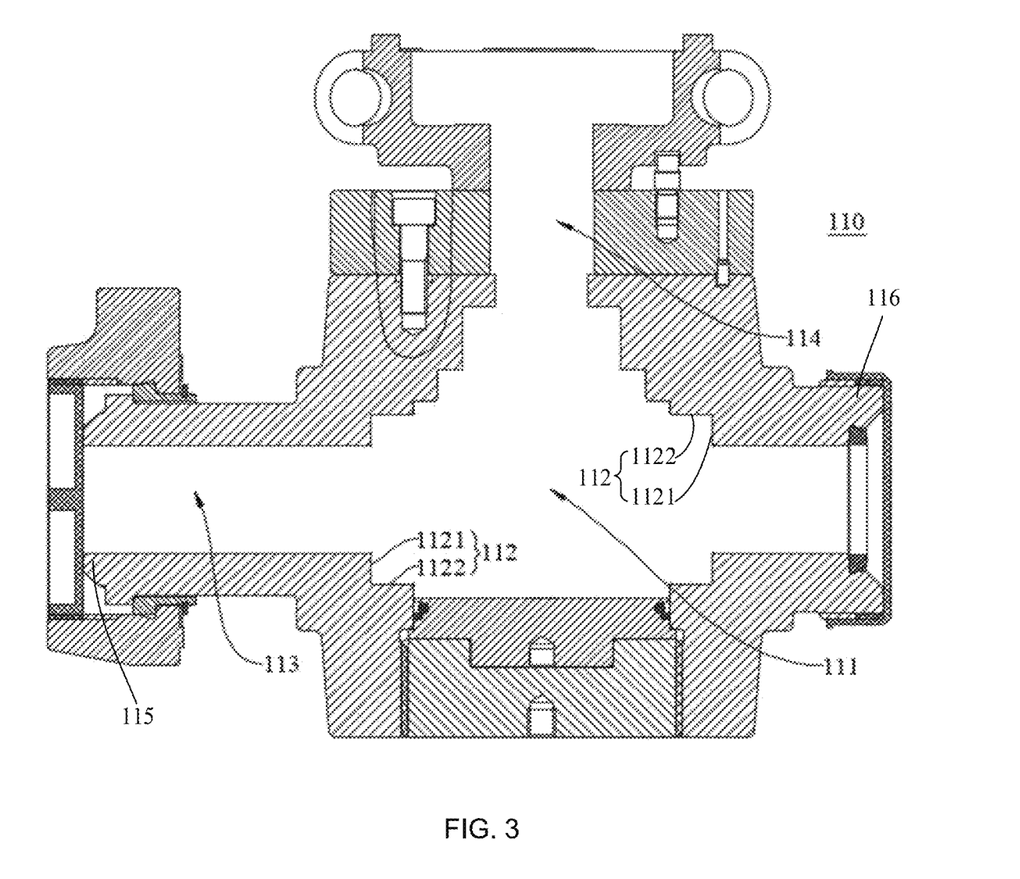
FIG. 3 is a structural sectional diagram of the valve body in FIG. 2.

In some embodiments, as shown in FIG. 2, the plug valve 100 includes a valve body 110, a valve core 120, a valve seat 101 and a valve stem 150. As shown in FIG. 3, the valve body 110 includes a valve cavity 111, a flow path 113 and a valve stem cavity 114. The flow path 113 penetrates a first end 115 and a second end 116 of the valve body 110 and communicates with the valve cavity 111. The valve stem cavity 114 communicates with the valve cavity 111 and is perpendicular to the flow path 113. Both the first end 115 and the second end 116 of the valve body 110 are connected to the pipe 200.

Usually, the valve core 120 and the valve seat 101 are disposed in the valve cavity 111 of the plug valve 100 together. The valve stem 150 penetrates the valve stem cavity 114 and is connected to the valve core 120 by means of threads, screws or keys, so as to control the rotation of the valve core 120. The valve core 120 has a cylindrical shape as a whole. The valve core 120 includes a valve core hole 121, and the valve core hole 121 is disposed on a side wall of the valve core 120 and penetrates the valve core 120. In some technologies, generally, the valve seat is a curved sheet with a through hole, and the curved sheet is fitted to the side wall of the valve core 120. When the valve stem 150 drives the valve core 120 to rotate until the valve core hole 121 communicates with the through hole and the flow path 113, the fluid may flow through the plug valve 100; and when the valve stem 150 drives the valve core 120 to rotate until the valve core hole 121 does not communicate with the through hole and the flow path 113, the function of shutting off the flow of the fluid in the plug valve 100 may be realized.

However, the curved sheet itself is a thin-walled member with low structural strength. During the opening and closing of the valve core 120, the curved sheet is easily deformed by a rotation torque of the valve core 120. Consequently, the sand particles accumulated in the plug valve enter a gap between the curved sheet and the valve core 120, causing the plug valve 100 to be stuck. In addition, the curved sheet needs to be positioned relative to the valve body 110 by a cylindrical pin. Since the curved sheet itself is a thin-walled member, the cylindrical pin used for positioning the curved sheet has a small diameter and low strength. During the opening and closing of the plug valve, when the valve stem 150 drives the valve core 120 to rotate, the cylindrical pin is prone to shear fracture, which affects the normal operation of the plug valve 100.

Some embodiments of the present disclosure provide a valve seat.

In some embodiments, as shown in FIG. 2, the valve seat 101 includes a sealing valve seat 130 and a mounting valve seat 140. The sealing valve seat 130 includes a sealing valve seat inner hole 135, and the mounting valve seat 140 includes a mounting valve seat inner hole 146. Two sealing valve seats 130 are respectively disposed on two opposite sides of the valve core 120, and two mounting valve seats 140 are respectively disposed between the corresponding sealing valve seat 130 and the valve body 110. A surface of an end of the sealing valve seat 130 away from the mounting valve seat 140 is fitted to a periphery of the valve core hole 121 of the valve core 120, and an end of the sealing valve seat 130 proximate to the mounting valve seat 140 is nested inside the mounting valve seat 140. An end of the mounting valve seat 140 away from the sealing valve seat 130 is disposed in the valve cavity 111 of the valve body 110. In an axial direction of the flow path 113 (i. e., an axial direction of the sealing valve seat inner hole 135 or an axial direction of the mounting valve seat inner hole 146) and a radial direction of the flow path 113 (i. e., a radial direction of the sealing valve seat inner hole 135 or a radial direction of the mounting valve seat inner hole 146), an outer surface of the sealing valve seat 130 abuts against an inner surface of the mounting valve seat 140, and an outer surface of the mounting valve seat 140 abuts against an inner surface of the valve cavity 111. The sealing valve seat 130 and the mounting valve seat 140 both have an annular shape, and the sealing valve seat inner hole of the sealing valve seat 130 and the mounting valve seat inner hole of the mounting valve seat 140 both communicate with the flow path 113.

By designing the valve seat 101 into a structure in which the sealing valve seat 130 is nested inside the mounting valve seat 140, and by arranging the mounting valve seat 140 on the side of the sealing valve seat 130 away from the surface thereof fitted to the valve core 120, the mounting valve seat 140 may serve as a support for the sealing valve seat 130; as a result, the structural strength of the sealing valve seat 130 on a side of the valve core 120 may be improved, and the sealing valve seat 130 is less likely to be deformed.

In addition, the mounting valve seat 140 may further abut against the valve cavity 111 of the valve body 110 in axial and radial directions of the flow path 113. Therefore, the valve seat 101 may be positioned in the valve cavity 111 by means of its own structure, without needing an extra structure (e.g., a cylindrical pin) to help position the valve seat 101 in the valve cavity 111. Moreover, the sealing valve seat 130 and the mounting valve seat 140 both have an annular shape, which not only increases a contact area between the valve seat 101 and the valve body 110, but also increase a contact area between the sealing valve seat 130 and the mounting valve seat 140. As a result, the valve seat 101 is not prone to shear fracture, thereby avoiding the technical problem that the valve seat is easily deformed.

Figure 4:
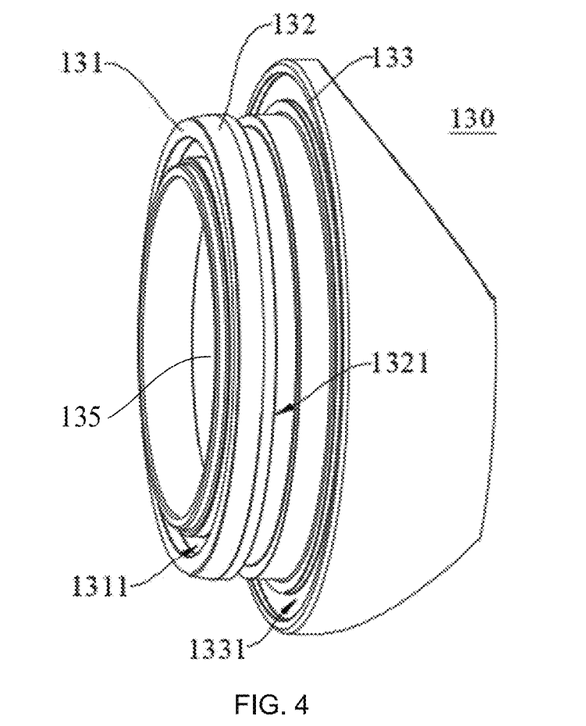
FIG. 4 is a first perspective three-dimensional structural diagram of the sealing valve seat in FIG. 2.

For example, as shown in FIG. 4, the sealing valve seat 130 has an annular shape. The sealing valve seat 130 includes the sealing valve seat inner hole 135, a first sealing surface 131, a second sealing surface 132 and a third sealing surface 133. In a case where the sealing valve seat 130 and the valve core 120 are both installed in the valve cavity 111, the first sealing surface 131, the second sealing surface 132 and the third sealing surface 133 are all located at an end of the sealing valve seat 130 away from the valve core 120. The first sealing surface 131 and the third sealing surface 133 are parallel to the radial direction of the flow path 113 (i. e., the radial direction of the sealing valve seat inner hole 135), and the second sealing surface 132 is parallel to the axial direction of the flow path 113 (i. e., the axial direction of the sealing valve seat inner hole 135). The first sealing surface 131 and the second sealing surface 132 are connected, and the second sealing surface 132 and the third sealing surface 133 are connected, so as to form a step-like shape.

In some embodiments, the first sealing surface 131 and the second sealing surface 132 are annular surfaces. In some other embodiments, the first sealing surface 131 and the second sealing surface 132 are polygonal annular surfaces. That is, an end of the sealing valve seat 130 where the first sealing surface 131 and the second sealing surface 132 are located is a square structure or a polygonal structure.

Figure 5:
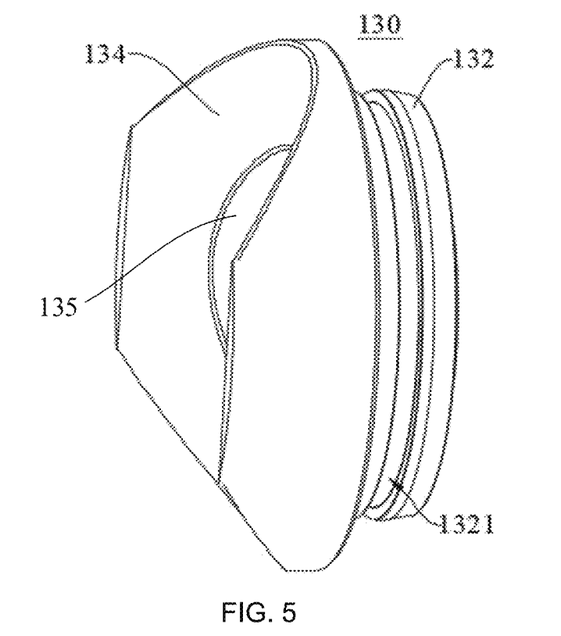
FIG. 5 is a second perspective three-dimensional structural diagram of the sealing valve seat in FIG. 2.

In some embodiments, as shown in FIG. 5, the surface of another end of the sealing valve seat 130 (that is, the surface disposed opposite to the first sealing surface 131) is a curved surface 134, and the curved surface 134 is fitted to the side wall of the valve core 120, so as to seal the valve core 120. An end of the sealing valve seat 130 where the curved surface 134 is located has a curved shape. Therefore, the sealing valve seat 130 has such an overall shape that one end thereof is cylindrical and the other end thereof is curved. The valve seat 101 in some embodiments of the present disclosure is thicker and heavier than the valve seat that is a thin-walled member with a curved sheet in some other technologies. Thus, an overall thickness of the entire valve seat may be increased, and a probability of the valve seat being deformed during manufacture and use may be reduced. As such, the manufacturing difficulty may be reduced, and the manufacturing accuracy may be improved. In some other embodiments, the sealing valve seat 130 is in the shape of a square cylinder or a polygonal cylinder depending on the shape of the valve cavity 111.

Figure 6:
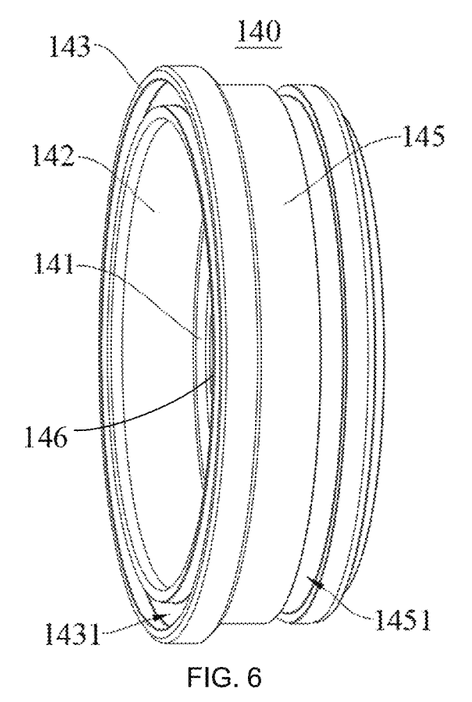
FIG. 6 is a first perspective three-dimensional structural diagram of the mounting valve seat in FIG. 2.

In some embodiments, as shown in FIG. 6, the mounting valve seat 140 has an annular shape. The mounting valve seat 140 includes the mounting valve seat inner hole 146, a first mounting surface 141, a second mounting surface 142 and a third mounting surface 143. In a case where both the mounting valve seat 140 and the sealing valve seat 130 are installed in the valve cavity 111, the first mounting surface 141, the second mounting surface 142 and the third mounting surface 143 are all located at an end of the mounting valve seat 140 proximate to the sealing valve seat 130. The first mounting surface 141 and the third mounting surface 143 are parallel to the radial direction of the flow path 113 (i. e., the radial direction of the mounting valve seat inner hole 146), and the second mounting surface 142 is parallel to the axial direction of the flow path 113 (i. e., the axial direction of the mounting valve seat inner hole 146). The first mounting surface 141 and the second mounting surface 142 are connected, and the second mounting surface 142 and the third mounting surface 143 are connected, so as to form a step-like shape. In some embodiments, both the first mounting surface 141 and the second mounting surface 142 are annular surfaces. In some other embodiments, the first mounting surface 141 and the second mounting surface 142 are polygonal annular surfaces. That is, an end of the mounting valve seat 140 where the first mounting surface 141 and the second mounting surface 142 are located is a square structure or a polygonal structure.

Figure 7:
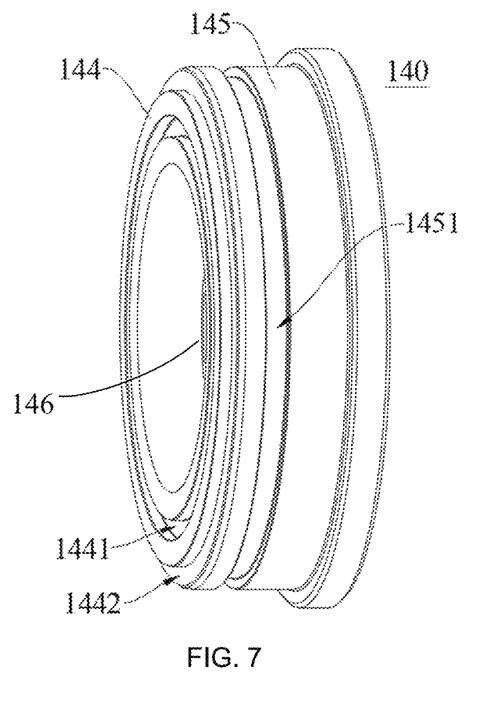
FIG. 7 is a second perspective three-dimensional structural diagram of the mounting valve seat in FIG. 2.

In some embodiments, as shown in FIG. 7, the mounting valve seat 140 further includes a fourth mounting surface 144 and a fifth mounting surface 145. The fourth mounting surface 144 and the fifth mounting surface 145 are located at another end of the mounting valve seat 140 (that is, an end disposed opposite to the first mounting surface 141). The fourth mounting surface 144 is parallel to the radial direction of the flow path 113, and the fifth mounting surface 145 is parallel to the axial direction of the flow path 113. The fourth mounting surface 144 and the fifth mounting surface 145 are connected to form a step-like shape.

In some embodiments, both the fourth mounting surface 144 and the fifth mounting surface 145 are annular surfaces. In some other embodiments, the fourth mounting surface 144 and the fifth mounting surface 145 are polygonal annular surfaces. That is, an end of the mounting valve seat 140 where the fourth mounting surface 144 and the fifth mounting surface 145 are located is a polygonal structure.

Based on this, in some embodiments, as shown in FIG. 3, the valve body 110 further includes a mounting hole 112 communicating with the valve cavity 111. Two mounting holes 112 are respectively disposed on opposite sides of the valve cavity 111. The mounting hole 112 includes a first hole wall 1121 and a second hole wall 1122. The first hole wall 1121 is parallel to the radial direction of the flow path 113, and the second hole wall 1122 is parallel to the axial direction of the flow path 113. The first hole wall 1121 and the second hole wall 1122 are connected to form a step-like shape. In some embodiments, both the first hole wall 1121 and the second hole wall 1122 are annular surfaces. In some other embodiments, the mounting hole 112 is a polygonal hole. That is, the first hole wall 1121 and the second hole wall 1122 is a square structure or a polygonal structure.

When assembling the plug valve 100, firstly, the mounting valve seat 140 is nested inside the mounting hole 112. That is, the fourth mounting surface 144 abuts against the first hole wall 1121, thereby realizing the positioning of the mounting valve seat 140 in the axial direction of the flow path 113; and the fifth mounting surface 145 abuts against the second hole wall 1122, thereby realizing the positioning of the mounting valve seat 140 in the radial direction of the flow path 113. Then, the sealing valve seat 130 is nested inside the mounting valve seat 140. That is, the first sealing surface 131 abuts against the first mounting surface 141, thereby realizing the positioning of the sealing valve seat 130 in the axial direction of the flow path 113; and the second sealing surface 132 abuts against the second mounting surface 142, thereby realizing the positioning of the sealing valve seat 130 in the radial direction of the flow path 113. After the sealing valve seat 130 and the mounting valve seat 140 are installed on both sides of the valve cavity 111, the valve core 120 is installed between the two sealing valve seats 130 which are disposed opposite to each other, so that the side wall of the valve core 120 is fitted to the curved surface 134 of the sealing valve seat 130. Finally, the valve stem 150 is inserted into the valve stem cavity 114 and connected to the valve core 120, thereby completing the assembly of the plug valve 100.

By designing the sealing valve seat 130 into a structure in which one end thereof is cylindrical and the other end thereof is curved, not only the overall thickness of the valve seat 101 may be increased, but also the sealing valve seat 130 is formed into a protruding structure in which an outer diameter of the first sealing surface 131 is less than an outer diameter of the third sealing surface 133. Therefore, the sealing valve seat 130 may be positioned relative to the mounting valve seat 140 by means of its own protruding structure. In addition, by designing both the sealing valve seat 130 and the mounting valve seat 140 to an annular structure, the contact area between the mounting valve seat 140 and the valve body 110 and the contact area between the sealing valve seat 130 and the mounting valve seat 140 may be increased, which improves a reliability of positioning the sealing valve seat 130. In this way, it may be possible to achieve a technical effect that the sealing valve seat 130 may not only be able to seal the valve core 120, but may also be positioned relative to the valve body 110. In addition, the sealing valve seat 130 and the mounting valve seat 140, as independent components, may be deformed to coordinate with each other, which facilitates the sealing of the valve core 120 by the sealing valve seat 130.

It will be understood that, in a case where the sealing valve seat 130 is in the shape of a polygon, a corresponding mounting valve seat 140 is also in the shape of a corresponding polygon. The polygonal shape may also prevent the sealing valve seat 130 from rotating when the sealing valve seat 130 is nested inside the mounting valve seat 140. Similarly, the mounting hole 112 is also in the shape of the corresponding polygon, so as to prevent the mounting valve seat 140 from rotating.

Figure 8:
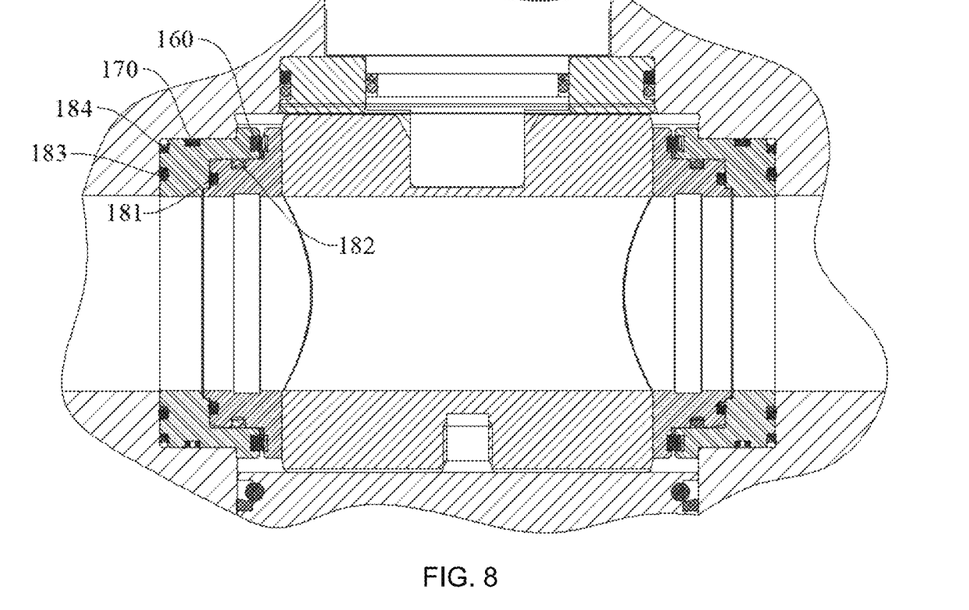
FIG. 8 is an enlarged structural diagram of the valve cavity in FIG. 2.

In order to improve the sealing performance of the sealing valve seat 130 to the valve core 120, in some embodiments, as shown in FIG. 8, the valve seat 101 further includes an elastic member 160. The elastic member 160 is disposed between the sealing valve seat 130 and the mounting valve seat 140. For example, as shown in FIGS. 4 and 6, the third sealing surface 133 includes a first elastic groove 1331, and the third mounting surface 143 includes a second elastic groove 1431. After the sealing valve seat 130 is nested inside the mounting valve seat 140, the elastic member 160 is disposed in a groove formed by splicing the first elastic groove 1331 and the second elastic groove 1431 together, and the elastic member 160 abuts against the sealing valve seat 130 and the mounting valve seat 140.

Figure 9:
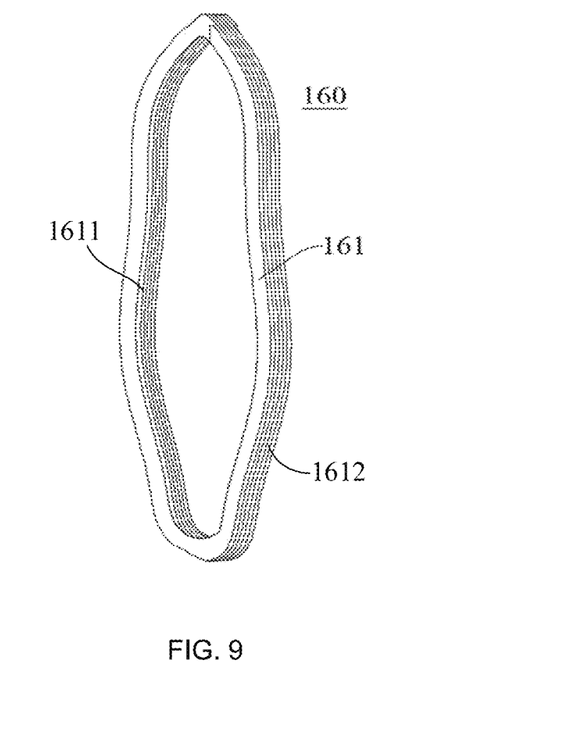
FIG. 9 is a three-dimensional structural diagram of the elastic member in FIG. 8.
Figure 10:
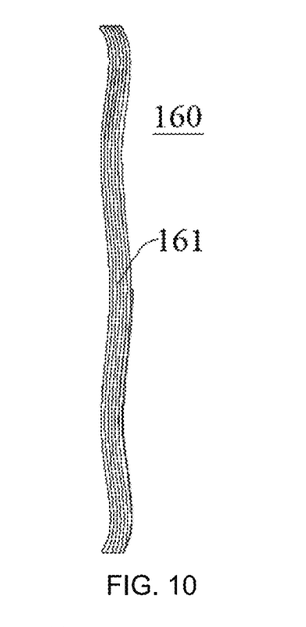
FIG. 10 is a front diagram of the elastic member in FIG. 8.

In some embodiments, as shown in FIG. 9, the elastic member 160 includes an elastic sheet 161 in an annular shape. As shown in FIG. 10, a plate surface of the elastic sheet 161 is wavy. That is, in an axial direction of the elastic sheet 161 (which is the same direction as the axial direction of the sealing valve seat inner hole 135 or the mounting valve seat inner hole 146), the plate surface of the elastic sheet 161 has a winding shape, while an inner ring 1611 and an outer ring 1612 of the elastic sheet 161 in the annular shape are both circular. The third sealing surface 133 and the third mounting surface 143 tend to move away from each other due to a thrust force of the wavy and winding plate surface of the elastic sheet 161, so that the mounting valve seat 140 exerts an elastic force on the sealing valve seat 130 through the elastic sheet 161 and thus presses the sealing valve seat 130 against the side wall of the valve core 120 to increase the sealing performance of the sealing valve seat 130 to the valve core 120. In some other embodiments, the elastic member 160 is designed to have a polygonal annular shape according to corresponding shapes of the sealing valve seat 130 and the mounting valve seat 140.

In addition, depending on a desired magnitude of the elastic force, the elastic member 160 may include at least one elastic sheet 161. In a case where the elastic member 160 includes a plurality of elastic sheets 161, plate surfaces of the plurality of elastic sheets 161 are in a same wavy shape, and the plurality of elastic sheets 161 are stacked along the axial direction of the elastic sheets 161, so as to increase the elastic force of the elastic member 160. The elastic sheet 161 in the annular shape makes the thrust force on the sealing valve seat 130 more uniform. In some embodiments, the plurality of elastic members 161 are independent of each other. However, in some other embodiments, the plurality of elastic sheets 161 are connected to form a helical structure, and the plurality of elastic sheets 161 having the helical structure are stacked along the axial direction of the elastic sheets 161, which may also provide a thrust force on the sealing valve seat 130. In some other embodiments, the elastic member 160 is a spring, a disc spring, an elastic rubber, or other structures.

In order to increase a degree to which the mounting valve seat 140 is restricted in the valve body 110, and prevent a vibration of the mounting valve seat 140 in the radial direction of the flow path 113, in some embodiments, as shown in FIG. 8, the mounting valve seat 140 further includes an expansion band 170, and the expansion band 170 is disposed on the outer ring of the valve seat 140. For example, as shown in FIG. 6, the mounting valve seat 140 further includes an expansion groove 1451. The expansion groove 1451 is disposed in the fifth mounting surface 145, and the expansion band 170 is disposed in the expansion groove 1451. The expansion band 170 disposed in the expansion groove 1451 expands and deforms after long-term use, and may abut between the second hole wall 1122 and the fifth mounting surface 145, thereby preventing the vibration of the mounting valve seat 140 in the radial direction of the flow path 113.

For example, a material of the expansion band 170 is plastic, such as polytetrafluoroethylene (PTFE) or modified PTFE, or a high-elasticity rubber material. In some embodiments, the expansion band 170 is disposed between the sealing valve seat 130 and the mounting valve seat 140. Alternatively, the expansion band 170 is disposed between the sealing valve seat 130 and the valve body 110, so as to restrict the vibration of the sealing valve seat 130 in the radial direction of the flow path 113. In addition, depending on the shapes of the sealing valve seat 130 and the mounting valve seat 140, in some other embodiments, the expansion band 170 is correspondingly in the shape of a polygonal ring.

In order to enhance the sealing performance between the sealing valve seat 130 and the mounting valve seat 140, in some embodiments, as shown in FIG. 8, the valve seat 101 further includes a first sealing ring 181 and a second sealing ring 182. The first sealing ring 181 and the second sealing ring 182 are disposed between the sealing valve seat 130 and the mounting valve seat 140. For example, as shown in FIG. 4, the sealing valve seat 130 includes a first sealing groove 1311 in an annular shape, the first sealing groove 1311 is disposed in the first sealing surface 131, and the first sealing ring 181 is disposed in the first sealing groove 1311, so as to seal a gap between the first mounting surface 141 and the first sealing surface 131. The second sealing surface 132 includes a second sealing groove 1321 in an annular shape, and the second sealing ring 182 is disposed in the second sealing groove 1321, so as to seal a gap between the second mounting surface 142 and the second sealing surface 132. In this way, it may be possible to effectively prevent the fluid in the flow path 113 from flowing into the gap between the sealing valve seat 130 and the mounting valve seat 140, and prevent the sand particles from being accumulated between the sealing valve seat 130 and the mounting valve seat 140.

In some embodiments, the valve seat 101 includes one of the first sealing ring 181 and the second sealing ring 182. In some embodiments, the first mounting surface 141 includes the first sealing groove, and the second mounting surface 142 includes the second sealing groove. In some other embodiments, the first sealing surface 131 includes a portion of the first sealing groove, and the first mounting surface 141 includes a remaining portion of the first sealing groove. The second sealing surface 132 includes a portion of the second sealing groove, and the second mounting surface 142 includes a remaining portion of the second sealing groove.

In order to enhance the sealing performance between the mounting valve seat 140 and the valve body 110, in some embodiments, as shown in FIG. 8, the valve seat 101 further includes a third sealing ring 183 and a fourth sealing ring 184. The third sealing ring 183 and the fourth sealing ring 184 are disposed between the mounting valve seat 140 and the valve body 110. For example, as shown in FIG. 7, the fourth mounting surface 144 includes a third sealing groove 1441 and a fourth sealing groove 1442 arranged to be concentric rings. An inner diameter of the third sealing groove 1441 is less than an inner diameter of the fourth sealing groove 1442. The third sealing ring 183 is disposed in the third sealing groove 1441, and the fourth sealing ring 184 is disposed in the fourth sealing groove 1442. The third sealing ring 183 and the fourth sealing ring 184 are used to seal a gap between the fourth mounting surface 144 and the first hole wall 1121, so as to effectively prevent the fluid in the flow path 113 from flowing into the gap between the mounting valve seat 140 and the valve body 110, and prevent the sand particles from being accumulated between the mounting valve seat 140 and the valve body 110.

In some embodiments, the valve seat 101 includes one of the third sealing ring 183 and the fourth sealing ring 184. In some embodiments, the first hole wall 1121 includes the third sealing groove and the fourth sealing groove. In some other embodiments, the first hole wall 1121 includes one of the third sealing groove and the fourth sealing groove, and the fourth mounting surface 144 includes the other of the third sealing groove and the fourth sealing groove. In yet some other embodiments, the first hole wall 1121 includes portions of the third sealing groove and the fourth sealing groove, and the fourth mounting surface 144 includes remaining portions of the third sealing groove and the fourth sealing groove.

In addition, depending on the shapes of the sealing valve seat 130 and the mounting valve seat 140, in some other embodiments, the first sealing ring 181, the second sealing ring 182, the third sealing ring 183 and the fourth sealing ring 184 are correspondingly in the shape of a square or polygonal ring. The first sealing ring 181, the second sealing ring 182, the third sealing ring 183 and the fourth sealing ring 184 may be made of silicone rubber, ethylene propylene rubber, fluorinated rubber, etc.

Figure 11:
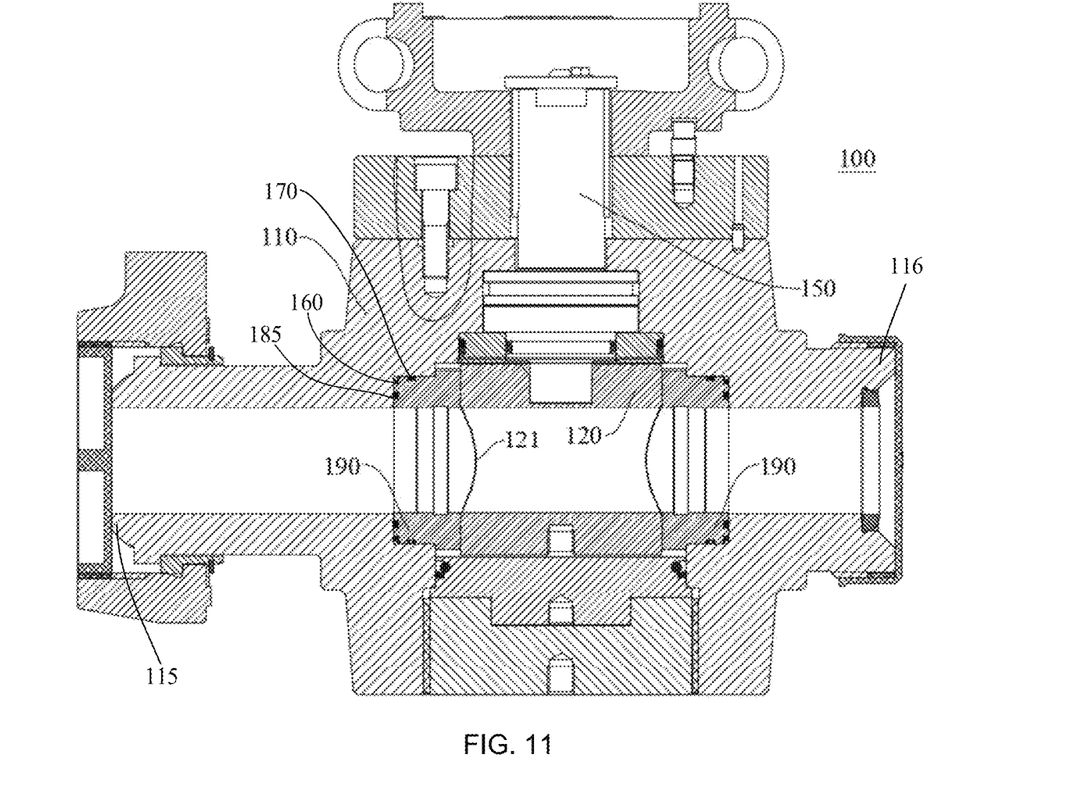
FIG. 11 is a structural sectional diagram of another plug valve in FIG. 1.
Figure 12:
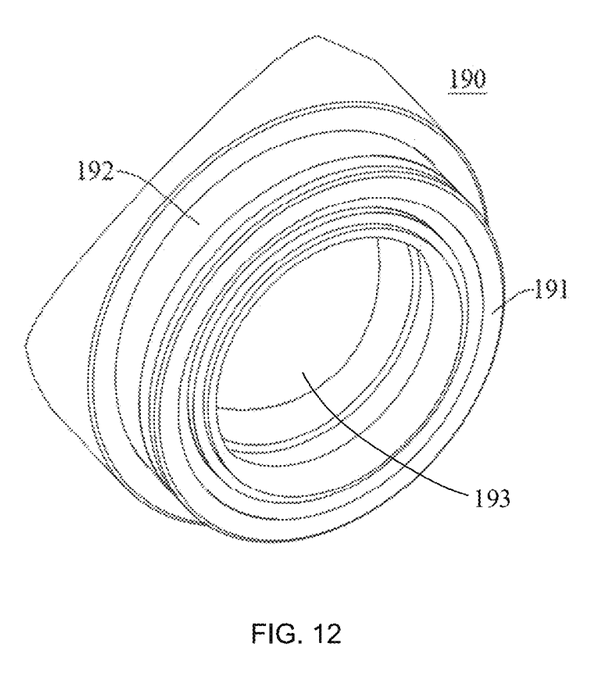
FIG. 12 is a three-dimensional structural diagram of the valve seat body in FIG. 11.

In some embodiments, as shown in FIG. 11, the sealing valve seat 130 and the mounting valve seat 140 are integrally formed into a valve seat body 190. For example, as shown in FIG. 12, the valve seat body 190 is an annular structure as a whole, and an inner hole 193 of the valve seat body 190 communicates with the flow path 113. The valve seat body 190 includes a first valve seat surface 191 and a second valve seat surface 192, and the first valve seat surface 191 and the second valve seat surface 192 are located at one end of the valve seat body 190. The first valve seat surface 191 is parallel to the radial direction of the flow path 113 (i. e., a radial direction of the inner hole 193), and the second valve seat surface 192 is parallel to the axial direction of the flow path 113 (i. e., an axial direction of the inner hole 193). The first valve seat surface 191 and the second valve seat surface 192 are connected to form a step-like shape. The surface of the valve seat body 190 at another end thereof opposite to the first valve seat surface 191 has the same structure as the curved surface 134 of the sealing valve seat 130. In this way, it may also be possible to realize the function of sealing one end of the valve seat body 190 with the valve core 120 and connecting the other end of the valve seat body 190 to the mounting hole 112 for positioning. In addition, compared with the curved sheet used for sealing in some technologies, the overall thickness of the valve seat 101 may be increased.

In some embodiments, both the first valve seat surface 191 and the second valve seat surface 192 are annular surfaces. In some other embodiments, the entire valve seat body 190 is in the shape of a polygonal cylinder. In addition, the valve seat body 190 may further include the elastic member 160, and the elastic member 160 is disposed between the first valve seat surface 191 of the valve seat body 190 and the first hole wall 1121, so as to abut the valve seat body 190 against the side wall of the valve core 120. The valve seat body 190 may further include an expansion band 170. The expansion band 170 is disposed between the second valve seat surface 192 and the second hole wall 1122, so as to prevent the valve seat body 190 from moving in the radial direction of the flow path 113. The valve seat body 190 may further include a fifth sealing ring 185. The fifth sealing ring 185 is disposed between the first valve seat surface 191 and the first hole wall 1121, so as to seal a gap between the valve seat body 190 and the valve body 110. As for the manner in which the elastic member 160, the expansion band 170 and the fifth sealing ring 185 are arranged, and the materials thereof, reference may be made to the foregoing embodiments, and details will not be repeated here.

The one-piece valve seat body 190 has a high structural rigidity, and is not easily deformed during whether the manufacturing process of the valve seat body 190 or the operation process of the valve seat body 190. Thus, a service life of the plug valve 100 may be effectively extended. In addition, compared with the sealing valve seat 130 and the mounting valve seat 140, which are independent components, the one-piece valve seat body 190 may further reduce the number of components used for sealing between the sealing valve seat 130 and the mounting valve seat 140. Thus, the leak points on the valve seat body 190 may be reduced, and the sealing performance between the valve body 110 and the valve seat may be improved.

In one aspect, the plug valve 100 provided in some embodiments of the present disclosure may improve the sealing performance of the valve core 120. In another aspect, the thickness of the valve seat 101 is greatly increased compared with the thickness of the curved sheet used for sealing. Therefore, it may be possible to avoid the problem that during operation of the plug valve 100, the deformation of the curved sheet used for sealing may cause sand particles to accumulate in the plug valve 100 and cause the plug valve 100 to be stuck. As such, the service life of the plug valve 100 may be extended. In addition, in a case where the thickness of the valve seat 101 is increased, the valve seat 101 is not easily deformed during the manufacturing process. Thus, the manufacturing difficulty of the valve seat 101 may be reduced, the manufacturing accuracy of the valve seat 101 may be improved, and the sealing effect of the plug valve 100 may be further ensured.

In the description of the specification, specific features, structures, materials or characteristics may be combined in any suitable manner in any one or more embodiments or examples.

The foregoing descriptions are merely specific implementations of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the scope of the present disclosure shall be subject to the protection scope of the claims.

What is claimed is:

1. A valve seat, comprising:
   a sealing valve seat in an annular shape, the sealing valve seat including a sealing valve seat inner hole, the sealing valve seat having one end in a cylindrical shape and another end in a curved shape; and
   a mounting valve seat in an annular shape, the mounting valve seat including a mounting valve seat inner hole, wherein
   the one end of the sealing valve seat in the cylindrical shape is nested inside the mounting valve seat, the another end of the sealing valve seat in the curved shape is nested outside the mounting valve seat, and the sealing valve seat inner hole communicates with the mounting valve seat inner hole;
   in longitudinal and radial directions of the sealing valve seat inner hole, or longitudinal and radial directions of the mounting valve seat inner hole, an outer surface of the sealing valve seat abuts against an inner surface of the mounting valve seat,
   wherein the sealing valve seat includes a first sealing surface and a second sealing surface; the first sealing surface and the second sealing surface are located at an end of the sealing valve seat proximate to the mounting valve seat; the first sealing surface is parallel to the radial direction of the sealing valve seat inner hole, the second sealing surface is parallel to the longitudinal direction of the sealing valve seat inner hole, and the first sealing surface and the second sealing surface are connected;

the mounting valve seat includes a first mounting surface and a second mounting surface; the first mounting surface and the second mounting surface are located at an end of the mounting valve seat proximate to the sealing valve seat; the first mounting surface is parallel to the radial direction of the mounting valve seat inner hole, the second mounting surface is parallel to the longitudinal direction of the mounting valve seat inner hole, and the first mounting surface and the second mounting surface are connected;

the first sealing surface abuts against the first mounting surface, and the second sealing surface abuts against the second mounting surface;

a surface of the sealing valve seat at the another end of the sealing valve seat arranged opposite the first sealing surface is a curved surface;

the valve seat further comprises an elastic structure;

the sealing valve seat further includes a third sealing surface; the third sealing surface is located at the end of the sealing valve seat proximate to the mounting valve seat, and the third sealing surface is parallel to the first sealing surface and includes a first elastic groove;

the mounting valve seat further includes a third mounting surface; the third mounting surface is located at the end of the mounting valve seat proximate to the sealing valve seat, and the third mounting surface is parallel to the first mounting surface and includes a second elastic groove; and the elastic structure is disposed in a groove formed by splicing the first elastic groove and the second elastic groove together, and the elastic structure abuts against the sealing valve seat and the mounting valve seat.

2. The valve seat according to claim 1, further comprising a first sealing ring and a first sealing groove;

the first sealing groove is located in the first sealing surface and/or the first mounting surface; the first sealing ring is disposed in the first sealing groove, and the first sealing ring seals the first mounting surface and the first sealing surface.

3. The valve seat according to claim 1, further comprising a second sealing ring and a second sealing groove;

the second sealing groove is located in the second sealing surface and/or the second mounting surface; the second sealing ring is disposed in the second sealing groove, and the second sealing ring seals the second mounting surface and the second sealing surface.

4. The valve seat according to claim 1, wherein the mounting valve seat includes a fourth mounting surface and a fifth mounting surface; the fourth mounting surface and the fifth mounting surface are located at an end of the mounting valve seat away from the sealing valve seat; the fourth mounting surface is parallel to the radial direction of the mounting valve seat inner hole, the fifth mounting surface is parallel to the longitudinal direction of the mounting valve seat inner hole, and the fourth mounting surface and the fifth mounting surface are connected to form a stepped shape.

5. The valve seat according to claim 4, further comprising a third sealing ring and a fourth sealing ring;

the fourth mounting surface includes a third sealing groove and a fourth sealing groove arranged to be concentric rings; the third sealing ring is disposed in the third sealing groove, and the fourth sealing ring is disposed in the fourth sealing groove.

6. The valve seat according to claim 4, wherein the valve seat further comprises an expansion band in an annular shape; the fifth mounting surface includes an expansion groove in an annular shape, and the expansion band is disposed in the expansion groove.

7. The valve seat according to claim 1, wherein the elastic structure includes at least one elastic sheet in an annular shape, and a plate surface of the elastic sheet is wavy.

8. The valve seat according to claim 7, wherein the elastic structure includes a plurality of elastic sheets; plate surfaces of all the elastic sheets are in a same wavy shape, and the plurality of elastic sheets are stacked.

9. The valve seat according to claim 8, wherein the plurality of elastic sheets are independent of each other; or, the plurality of elastic sheets are connected to form a helical structure.

10. The valve seat according to claim 1, wherein the sealing valve seat and the mounting valve seat are integrally formed into a valve seat body in an annular shape;

the valve seat body includes an inner hole, and the sealing valve seat inner hole and the mounting valve seat inner hole are integrally formed into the inner hole.

11. The valve seat according to claim 10, wherein the valve seat body includes a first valve seat surface and a second valve seat surface; the first valve seat surface is parallel to a radial direction of the inner hole, and the second valve seat surface is parallel to a longitudinal direction of the inner hole; and the first valve seat surface and the second valve seat surface are connected to form a stepped shape.

12. The valve seat according to claim 11, wherein a surface of the valve seat body arranged opposite the first valve seat surface is a curved surface.

13. A plug valve, comprising:

a valve body, the valve body including a valve cavity and a flow path communicating with the valve cavity;

a valve core, the valve core being disposed in the valve cavity and including a valve core hole penetrating the valve core; and two valve seats according to claim 1, the two valve seats being disposed on both sides of the valve core and opposite each other, and two sealing valve seat inner holes and two mounting valve seat inner holes communicating with the flow path, wherein a surface of each sealing valve seat away from the mounting valve seat is fitted to a periphery of the valve core hole of the valve core, and a surface of each mounting valve seat away from the sealing valve seat abuts against an inner surface of the valve cavity.

14. The plug valve according to claim 13, wherein the sealing valve seat and the mounting valve seat are integrally formed into a valve seat body in an annular shape; the valve seat body includes an inner hole, and the sealing valve seat inner hole and the mounting valve seat inner hole are integrally formed into the inner hole; the valve seat body includes a first valve seat surface and a second valve seat surface; the first valve seat surface is parallel to a radial direction of the inner hole, and the second valve seat surface is parallel to a longitudinal direction of the inner hole;

the valve body includes a mounting hole communicating with the valve cavity, and the mounting hole includes a first hole wall and a second hole wall that form a stepped shape; the first hole wall is parallel to a radial direction of the mounting valve seat inner hole, and the second hole wall is parallel to the longitudinal direction of the mounting valve seat inner hole, wherein the first valve seat surface abuts against the first hole wall, and the second valve seat surface abuts against the second hole wall.

15. A fracturing manifold comprising at least two pipes and the plug valve according to claim 13, wherein the plug valve is disposed between two adjacent pipes, and the two adjacent pipes both communicate with the flow path of the plug valve.

16. The plug valve according to claim 13, wherein
the valve body includes a mounting hole communicating with the valve cavity, and the mounting hole includes a first hole wall and a second hole wall that form a stepped shape; the first hole wall is parallel to the radial direction of the mounting valve seat inner hole, and the second hole wall is parallel to a longitudinal direction of the mounting valve seat inner hole;
the mounting valve seat includes a fourth mounting surface and a fifth mounting surface; the fourth mounting surface and the fifth mounting surface are located at an end of the mounting valve seat away from the sealing valve seat; the fourth mounting surface is parallel to the radial direction of the mounting valve seat inner hole, the fifth mounting surface is parallel to the longitudinal direction of the mounting valve seat inner hole, and the fourth mounting surface and the fifth mounting surface form a stepped shape, wherein
the fourth mounting surface abuts against the first hole wall, and the fifth mounting surface abuts against the second hole wall.

17. The plug valve according to claim 16, further comprising a valve stem; the valve body includes a valve stem cavity communicating with the valve cavity, and the valve stem is located in the valve stem cavity and connected with the valve core.

* * * * *